United States Patent
Kothari et al.

(10) Patent No.: US 7,395,312 B2
(45) Date of Patent: Jul. 1, 2008

(54) INTEGRATING ONLINE COMMUNITY AND PROGRAM DEVELOPMENT ENVIRONMENTS

(75) Inventors: Nikhil Kothari, Sammamish, WA (US); Andrew C. Lin, Seattle, WA (US); Scott D. Guthrie, Bellevue, WA (US); Susan M. Warren, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 10/410,099

(22) Filed: Apr. 8, 2003
(Under 37 CFR 1.47)

(65) Prior Publication Data
US 2004/0205200 A1    Oct. 14, 2004

(51) Int. Cl.
*G06F 15/16* (2006.01)
(52) U.S. Cl. ..................... 709/205
(58) Field of Classification Search ............. 709/205, 709/201, 202, 229; 717/100, 120, 102; 715/733
See application file for complete search history.

(56) References Cited

U.S. PATENT DOCUMENTS

| | | | |
|---|---|---|---|
| 6,067,548 A * | 5/2000 | Cheng ................... | 707/103 R |
| 6,609,246 B1 * | 8/2003 | Guhr et al. .............. | 717/103 |
| 2002/0103883 A1 * | 8/2002 | Haverstock et al. ..... | 709/219 |
| 2002/0184610 A1 * | 12/2002 | Chong et al. ............ | 717/109 |
| 2003/0037181 A1 * | 2/2003 | Freed ..................... | 709/328 |
| 2004/0040012 A1 * | 2/2004 | Barsness et al. ......... | 717/123 |
| 2005/0229154 A1 * | 10/2005 | Hiew et al. .............. | 717/110 |
| 2006/0053410 A1 * | 3/2006 | Charisius et al. ........ | 717/109 |
| 2006/0129978 A1 * | 6/2006 | Abrari et al. ............ | 717/110 |

* cited by examiner

*Primary Examiner*—Abdullahi Salad
(74) *Attorney, Agent, or Firm*—Workman Nydegger

(57) ABSTRACT

An Integrated Development Environment (IDE) is configured with an online community interface for accessing online community resources, such as contacts and information, directly through the Internet or other networks. The online community interface displays icons and other selectable objects that are associated with contacts or webpages. Upon selecting an object associated with a contact, an email or instant messaging window is launched that enables communication with the one or more contacts. Upon selecting an object associated with a webpage, a browser is launched that accesses and displays the webpage. The online community interface also enables an IDE element, such as a development tool or program snippet to be copied from the IDE and sent to a desired contact through the IDE interface.

30 Claims, 3 Drawing Sheets

INTEGRATING ONLINE COMMUNITY AND PROGRAM DEVELOPMENT ENVIRONMENTS

BACKGROUND OF THE INVENTION

1. The Field of the Invention

The present invention relates to the field of computers and, more particularly, to methods and systems for integrating online community resources with program development environments.

2. Background and Relevant Art

As the computer industry continues to develop, so do the means for communicating through computing devices. It is now commonplace, for example, to use personal computers to communicate via e-mail, facsimile, instant messaging (IM), telephony, video teleconferencing (VTC), and so forth. The ability to communicate through personal computers is largely enabled by the use of the Internet and other similar networks. In addition to enabling communication, the Internet also provides access to a large variety of information that is stored in the various computers that are linked together by the Internet. Inasmuch as both people and information can be accessed through the Internet, and other such networks, they are both referred to herein as online community resources.

Advances in the computer industry have also improved the systems and program development environments that are used to develop code and create computer programs. These systems and environments are collectively referred to herein as Integrated Development Environments (IDEs). IDEs often include graphical interfaces comprising toolboxes of components that can be used for developing code. Non-limiting examples of programming components include controls, IDE extensions and plugins.

A Rapid Application Development (RAD) system, which exemplifies one type of an IDE, includes visual tools that can be selected by a programmer to build programs very quickly in a design environment without requiring the programmer to author every line of code. RAD systems historically emphasized the programming speed at which code could be developed at the expense of generating efficient code. However, they can now be used to produce code quickly and without compromising the efficiency of the code.

Other traditional programming environments have also made improvements that enable them to utilize many of the visual tools and graphical interfaces that were previously available only in a RAD system. Accordingly, the distinction between RAD systems and non-RAD systems is somewhat blurred. Therefore, embodiments within the scope of the present application extend broadly to any IDE.

Although existing IDEs are useful, they are also somewhat limited because they fail to provide access to online community resources that could otherwise facilitate the development of computing programs within the IDEs. In particular, existing IDEs do not currently provide tools or interfaces that enable a programmer to directly access and communicate with others through the Internet. Existing IDEs also fail to provide direct access to information that can be obtained from the Internet. Instead, programmers must access the Internet externally from the IDE in which they are working in order to access the desired online community resources.

BRIEF SUMMARY OF THE INVENTION

The present invention is principally directed to methods and systems for integrating online community resources within program development environments.

According to one aspect of the invention, an Integrated Development Environment (IDE) is configured with an online community interface for communicating with other parties directly through the Internet or other networks. The online community interface displays icons and other selectable objects that are associated with contacts who can be communicated with over the Internet. Upon selecting the displayed object, an email or instant messaging window is launched that enables communication with the one or more contacts.

The online community interface also enables an IDE element, such as a development tool or program snippet to be copied from the IDE and sent to a desired party. This can be accomplished, for example, by attaching the IDE element to a message that is sent to a contact. In one embodiment, the IDE element is dragged and dropped onto a display object that is associated with a contact. This action automatically causes the IDE element to be transmitted to the contact.

According to another aspect of the invention, the online community interface identifies one or more websites that can be accessed through the Internet or other network. When a programmer clicks on the desired website, a browser is launched and the desired website is displayed. In certain embodiments, the browser is launched from within the IDE, such that the selected website is displayed in a window associated with the IDE. In other embodiments, the browser is launched externally from the IDE, but in response to input received within the IDE.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
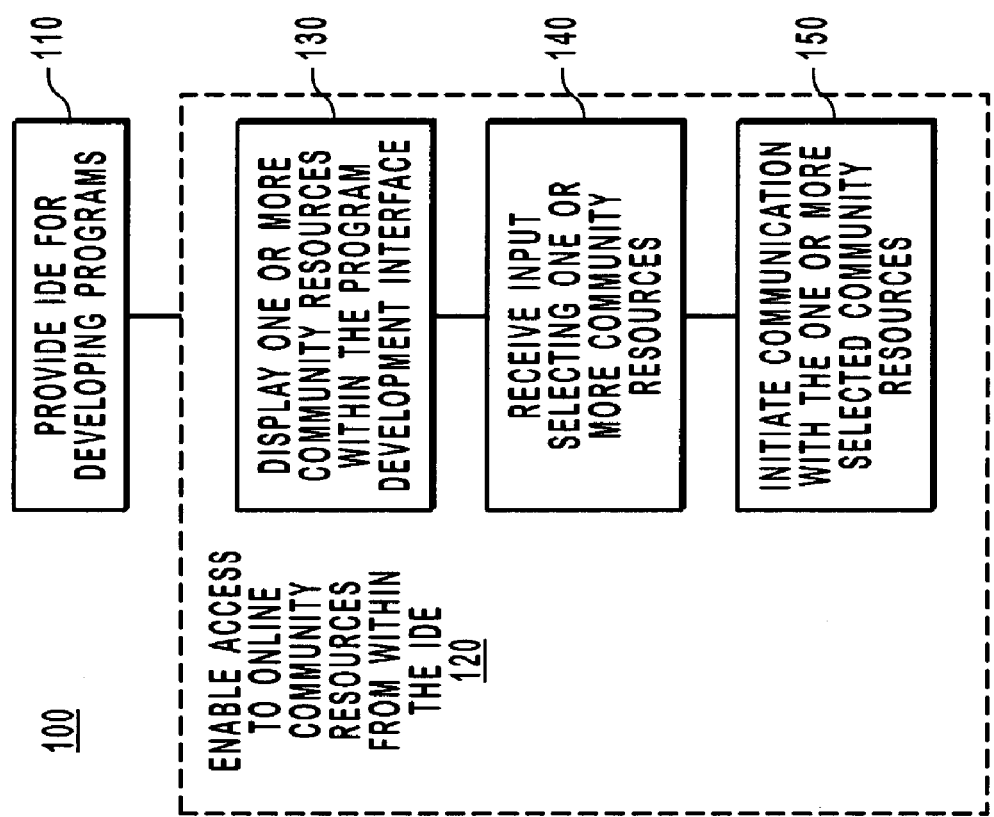
FIG. 1 illustrates a flow diagram of one embodiment of a method for integrating a program development environment and online community resources according to the invention.

The present invention is related to methods and systems for integrating online community resources and program development environments. According to one aspect of the invention, an online community interface, which is provided within an Integrated Development Environment (IDE), is configured to provide access to online community resources in response to input received within the IDE.

Online community resources are generally defined herein as information and contacts that can be accessed through the Internet or other networks. The term contacts refers to people, groups, organizations and other entities that can be contacted through a computing system, such as, for example, through email, telephony, video teleconference, instant messaging, etc.

The term program development environment, which is used interchangeably herein with the term "Integrated Development Environment" (IDE), generally refers to any system that is used for developing computing programs, including, but not limited to Rapid Application Development (RAD) systems. An "IDE element" is defined herein to include any tool or component of an IDE system, as well as any code or content that is displayed or created within the IDE.

Although not required, the invention will now be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

It will be appreciated that the embodiments of the present invention may comprise a special purpose or general-purpose computer including various computer hardware and software, as discussed in greater detail below. In particular, embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other physical storage media, such as optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device, such as a GPU, to perform a certain function or group of functions.

Figure 3:
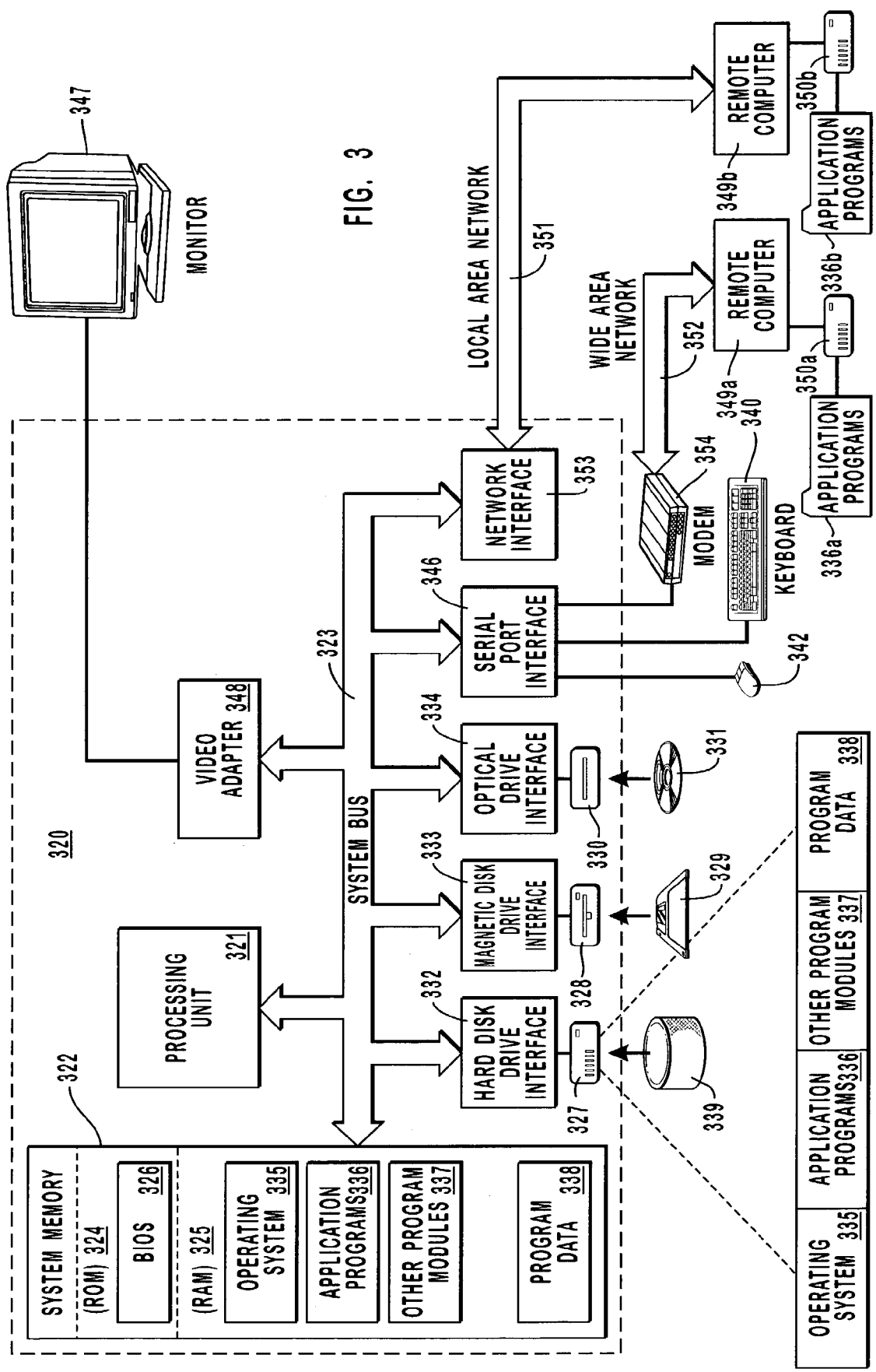
FIG. 3 illustrates one embodiment of a computing environment in which methods of the invention may be practiced.

FIG. 3, which is described in detail below, exemplifies one embodiment of a computing environment in which the methods of the invention can be practiced.

Integrating Online Community Resources

Attention is now directed to FIG. 1, which illustrates a flowchart of one embodiment of a method for integrating online community resources and program development environments. As shown, the method includes an act of providing an IDE for developing programs (act 110), a step for enabling access to online community resources from within the IDE (step 120), and corresponding acts of displaying one or more community resources (act 130), receiving input selecting one or more community resources (act 140), and initiating communication with the one or more selected community resources (act 150). Each of the foregoing acts and step will now be described with specific reference to FIG. 2.

Figure 2:
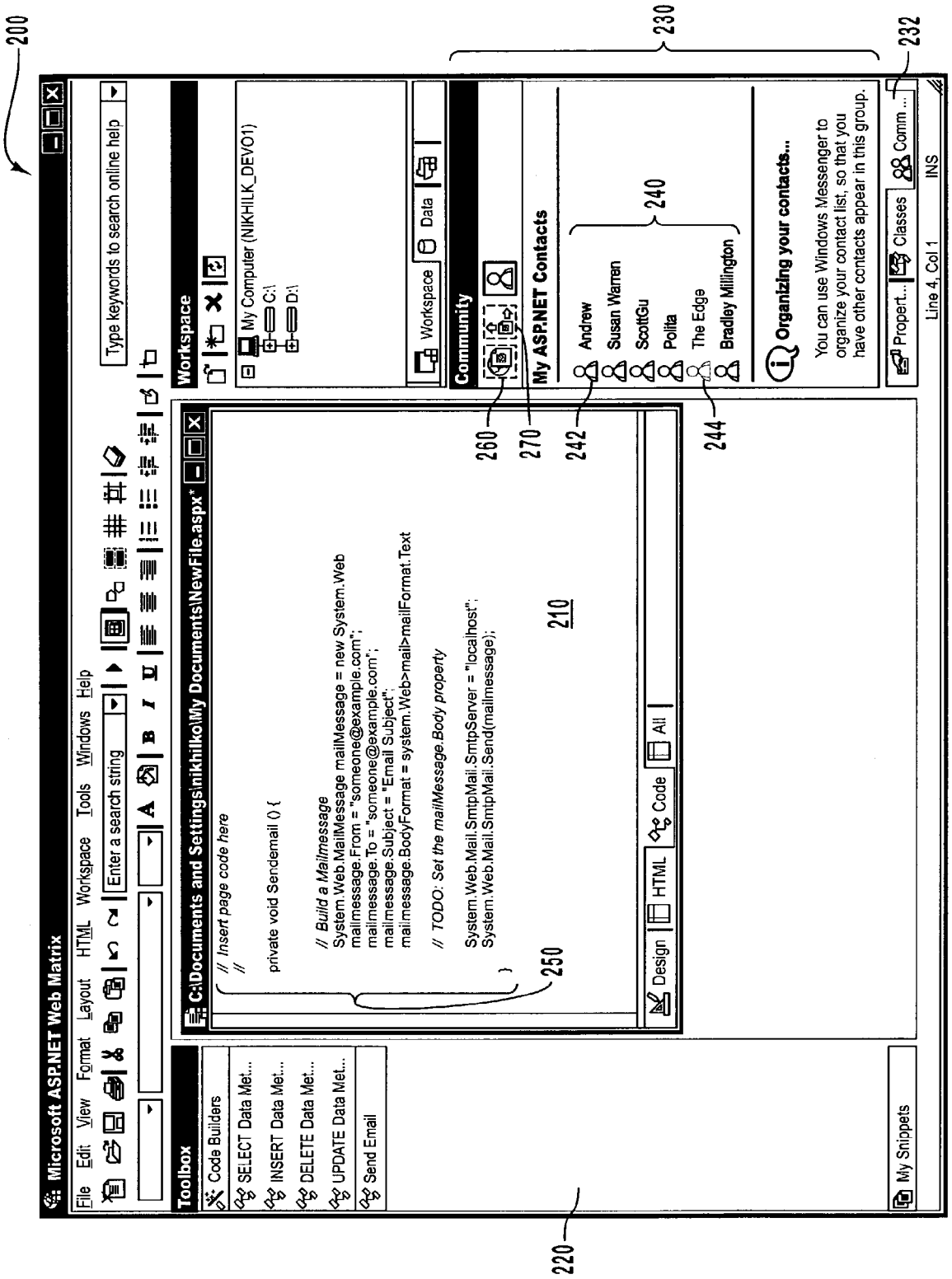
FIG. 2 one embodiment of an integrated development environment that includes an online community interface configured to provide access to online community resources from within the integrated development environment.

FIG. 2 illustrates one embodiment of an IDE 200 that is configured for developing computing programs (act 110). In particular, the IDE 200 includes various tools and components contained in an IDE toolbox 220 that can be utilized for developing code and content of a program. It will be appreciated, however, that the scope of the invention is not limited to embodiments in which IDEs have a particular configuration of toolboxes or development tools and components. Rather, the invention extends to broadly to embodiments of all IDEs that can be configured to directly access online community resources as described herein.

In the present embodiment, the IDE 200 includes a programming window 210 that is configured to receive user input comprising programming code and content for developing and editing computing programs. In the present illustration, a program code is being developed for sending an email message.

The IDE 200 also includes an online community interface 230, which is displayed within a portion of the IDE 200. The online community interface 230 can be launched and displayed automatically, or in response to user input. For example, according to one embodiment, the online community interface 230 is launched when an appropriate menu option has been selected by a user, such as menu button 232. In other embodiments, the online community interface 230 is displayed automatically whenever the IDE is launched.

The online community interface 230 is configured to display links to community resources, such as contacts and webpages that can be accessed over the Internet. In the present embodiment, for example, a list 240 of contacts is displayed that comprise individual contacts. It will be appreciated, however, that the list of contacts can also be configured to identify groups, organizations, or other entities that can be accessed over the Internet or other network.

In the present embodiment, The displayed list 240 also provides the developer with various information about each of the contacts, in addition to enabling communication with the contacts. In particular, the Online/Offline status of each contact is displayed by the shading of the icon next to the contacts name. For instance, the icon 242 is displayed in a normal shade, indicating that Andrew is Online. In contrast, the icon 244 is displayed in a phantom shade, indicating that "The Edge" is Offline. In some embodiments, the color, size, type, and animated state of the icons and text associated with a contact can also be modified to visually identify and distinguish the status of the various contacts.

When one of the displayed contacts 240 is selected (act 140) then communication with the contact is initiated (act 150) by an appropriate communication module or application. A contact can be selected with any known selection technique. For example, a mouse prompt can be clicked on the icon or name of a contact. In other embodiments, a contact is selected when an IDE element (e.g., code, content, tool) is dragged and dropped onto the contact icon or name. In response to the user input selecting a contact, a communication interface (not shown) is launched within the IDE 200. The communication interface can include an email interface, an instant messaging interface, a telephony or fax interface, or any other interface configured to enable communication. In certain embodiments, the communication interface is integrated with the IDE 200. In other embodiments, the communication interface includes an external communication interface that is launched inside of the IDE 200 display interface. In yet other embodiments, the communication interface is launched outside of the IDE 200, but in response to input received within the IDE 200, as described.

The number of contacts that can accessed through the IDE 200 at any time is not limited within the scope of the invention. Accordingly, a developer can any number of contacts to initiate simultaneous communication with the contacts. In one embodiment, for example, a single email or instant message is simultaneously sent to a plurality of selected contacts.

It will be appreciated that the ability to access online community resources (e.g., contacts) from within an IDE 200, and in response to input received within an IDE 200, provides an improvement over existing program development environments in the art. It will also be appreciated, however, that the types of online community resources that can be accessed from within the IDE 200 are not limited to personal contacts.

For instance, in other embodiments, the online community interface 230 is configured to display online community resources comprising webpages that may be of interest to a program developer. The webpages can be displayed, for example, by clicking on object 260 or another suitable menu option associated with the webpages. Upon receiving appropriate user input, the online community interface 230 changes its contents and displays the corresponding links to one or more webpages. The webpages may include program development websites containing information regarding program development, additional tools and updates for download, chat boards for interacting with other developers, as well as other types of websites.

When one of the website links is selected, a browser is launched within the IDE 200 that accesses the corresponding website over the Internet or another appropriate network. In certain embodiments, the browser can also be launched outside of the IDE 200, but is in response to input that is received within the IDE 200. The acts of launching a browser and accessing the website of an online community resource comprise the act of initiating communication with an online community resource (act 150) within the scope of the invention.

In one embodiment of the invention, the online community interface is also configured to display news and articles that may be of interest to the developer. The news and articles may be freely available or only available through subscription. To access the news and articles, an appropriate option, such as button 270, can be selected from the online community interface 230. The news and articles can be displayed directly in response to a selection of button 270 or indirectly by identifying links to the news and articles that must first be selected by the developer. In certain embodiments, the news and articles are automatically updated on a frequent periodic basis, as determined by user settings and availability of new information. The news and articles can be automatically updated, for example, whenever the user's computer is connected to the Internet.

In summary, the present invention provides methods and systems for integrating online community resources and program development environments. Although certain specific examples have been provided above with respect to the types of online community resources that can be accessed and the acts involved in accessing them, it will be appreciated that the present invention extends broadly to any method and system for accessing online community resources from within an IDE, or in response to input that is received within the IDE.

Accordingly, although the method illustrated by the flowchart 100 of FIG. 1 shows that the step for enabling access to online community resources from within the IDE (step 120) includes corresponding acts 130, 140 and 150, it will be appreciated that step 120 can also include other combinations of corresponding acts for enabling access to online community resources from within an IDE. For example, as generally described above, enabling access to online community resources can also include the corresponding acts of launching communication interfaces within or outside of the IDE. In another embodiment, the step for enabling access to online community resources from within an IDE does not include the acts of displaying community resources. In such an embodiment, the developer provides a URL, email address, or other electronic address that corresponds to a contact within an appropriate type-in line to initiate communication with the online community resource.

Accordingly, it will be appreciated that the present invention may be embodied in other specific forms without departing from its spirit or essential characteristics Operating Environment It will also be appreciated by those of skill in the art that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 3 and the following discussion are intended to provide a brief, general description of a suitable computing environment for implementing certain elements of the invention. However, it should be emphasized that the present invention is not necessarily limited to any particular computerized system and may be practiced in a wide range of computerized systems.

According to one embodiment, the present invention includes one or more computer readable media storing computer-executable instructions, such as program modules, that can be executed by computing devices. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments, in addition to individual computing device, with many types of computer system configurations, including personal computers, hand-held devices, multi-processor systems, microprocessor-based or programmable consumer electronics, network PCs, minicomputers, mainframe computers, components thereof, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With specific reference to FIG. 3, an exemplary system for implementing certain elements of the invention includes a general purpose computing system in the form of a conventional computer 320, including a processing unit 321, a system memory 322 comprising computer readable media, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. These storage media can also be used to store data structures associating correction coefficients with gamma values, as described above. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In this context, the video adapter 348 is considered to include a GPU as described above. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a networking environment, the computer 20 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system with an operating system running one or more software applications, the one or more software applications including an integrated development environment configured to receive user input for developing computing programs, a method for enabling access to one or more online community resources from within the integrated development environment, the method comprising:

an act of providing an integrated development environment that is configured to develop one or more computing programs;

an act of displaying at least one link within the integrated development environment, the at least one link to information related to development of the one or more computer programs, the information being accessible over a network in response to user input received from within the integrated development environment;

an act receiving user input selecting the at least one link; and a step for enabling access to the information related to development of the one or more computer programs using the integrated development environment, the integrated development environment opening an integrated Web browser within the integrated development environment in response to user input selecting the at least one link such that the integrated web browser appears to be part of the integrated development environment, the integrated web browser including the information corresponding to the displayed link.

2. A method as recited in claim 1, wherein the online community resources include information that is contained within one or more Internet webpages, and wherein the step for enabling access to online community resources includes an act of accessing the one or more Internet webpages in response to user input that is received within the integrated development environment.

3. A method as recited in claim 2, wherein the act of accessing the one or more Internet webpages includes displaying the one or more webpages within the integrated development environment.

4. A method as recited in claim 1, wherein the online community resources include one or more contacts, and wherein the step for enabling access to online community resources includes an act of initiating a communication with the one or more contacts in response to user input received within the integrated development environment.

5. A method as recited in claim 4, wherein the communication occurs at least in part from within the integrated development environment.

6. A method as recited in claim 4, wherein the communication includes an act of sending an element of the integrated development environment to the one or more contacts.

7. A method as recited in claim 6, wherein the element includes at least one of program code, program content, a development tool.

8. A method as recited in claim 1, wherein the step for enabling access includes:
   an act of displaying one or more links to one or more online community resources that can be accessed in response to user input that is received from within the integrated development environment;
   an act receiving input selecting the one or more links; and
   an act of initiating communication with the one or more selected online community resources which correspond with the selected one or more links.

9. A method as recited in claim 8, wherein the one or more online community resources includes at least one of a webpage and a contact.

10. In a computing system with an operating system running one or more software applications, the one or more software applications including an integrated development environment configured to receive user input for developing computing programs, a method for enabling access to one or more online community resources from within the integrated development environment, the method comprising:
   an act of providing an integrated development environment that is configured to develop one or more computing programs;
   an act of displaying one or more links within the integrated development environment, the links configured to interact with an integrated electronic message client interface that is part of the integrated development environment, the links corresponding to one or more contacts that can be communicated with over a network and from within the integrated development environment using the integrated electronic message client interface;
   an act receiving user input selecting a first link corresponding to a first contact; and
   in response to receiving the user input selecting the first link corresponding to the first contact, an act of initiating the integrated electronic message client interface within the integrated development environment, the integrated electronic message client being configured to initiate a communication with the first contact, wherein the communication includes transmitting at least one of an element of the integrated development environment related to development of the one or more computer programs and a message from the user to the first contact, the integrated electronic message client interface being opened within the integrated development environment such that the integrated electronic message client interface appears to be part of the integrated development environment.

11. A method as recited in claim 10, further including an act of receiving user input selecting a second link corresponding to a second contact, and an act of initiating a communication with second contact in response to the user input selecting the second link.

12. A method as recited in claim 11, wherein at least part of the communications with the first and second contacts occur simultaneously.

13. A method as recited in claim 12, wherein the at least part of the communications occurs through one of instant messaging, email, telephony, and facsimile.

14. A method as recited in claim 10, wherein each of the one or more links is displayed in a manner that reflects a network presence of each of the one or more contacts.

15. A method as recited in claim 14, wherein the network presence is reflected by at least one of a color, size, animation, and shading of each of the one or more links.

16. A method as recited in claim 10, wherein the first link is selected by clicking on the first link.

17. A method as recited in claim 10, wherein the element includes at least one of a development tool, program code, and program content.

18. In a computing system with an operating system running one or more software applications, the one or more software applications including an integrated development environment configured to receive user input for developing computing programs, a method for enabling access to one or more online community resources from within the integrated development environment, the method comprising:
   an act of providing an integrated development environment that is configured to develop one or more computing programs;
   an act of displaying at least one link within the integrated development environment, the at least one link to information related to development of the one or more computer programs, the information being accessible over a network in response to user input received from within the integrated development environment;
   an act of receiving user input selecting the at least one link;
   an act of initiating an integrated Web browser within the integrated development environment to access the information related to development of the one or more computer programs, the integrated web browser being opened within the integrated development environment in response to receiving user input selecting the at least one link such that the integrated web browser appears to be part of the integrated development environment, the integrated web browser including the information corresponding to the displayed link; and
   an act of displaying the information related to development of the one or more computer programs associated with the at least one link within the integrated Web browser within the integrated development environment in response to the user input selecting the at least one link.

19. A method as recited in claim 18, wherein the network includes the Internet.

20. A method as recited in claim 19, wherein the information is contained in a webpage.

21. A method as recited in claim 20, wherein the information is provided only to members of a subscription service.

22. A computer program product for use in a computing system with an operating system running one or more software applications, the one or more software applications including an integrated development environment configured to receive user input for developing computing programs, the computer program product comprising:

one or more computer-readable media having computer-executable instructions for implementing a method for enabling access to one or more online community resources from within the integrated development environment, the method including:

an act of displaying at least one link within the integrated development environment, the at least one link to information related to development of the one or more computer programs, the information being accessible over a network in response to user input received from within the integrated development environment;

an act of receiving user input selecting the at least one link;

an act of initiating an integrated Web browser within the integrated development environment to access the information related to development of the one or more computer programs, the integrated web browser being opened within the integrated development environment in response to receiving user input selecting the at least one link such that the integrated web browser appears to be part of the integrated development environment, the integrated web browser including the information corresponding to the displayed link; and an act of displaying the information related to development of the one or more computer programs associated with the at least one link within the integrated Web browser within the integrated development environment in response to the user input selecting the at least one link.

23. A computer program product as recited in claim 22, wherein the information includes one or more contacts.

24. A computer program product as recited in claim 22, wherein the communication includes an email communication.

25. A computer program product as recited in claim 22, wherein the communication includes instant messaging.

26. A computer program product as recited in claim 22, wherein the information includes information received over a network.

27. A computer program product as recited in claim 26, wherein the network is the Internet.

28. A computer program product as recited in claim 27, wherein the information includes a webpage.

29. The method of claim 10, wherein the first link is selected by dragging and dropping an element of the integrated development environment onto the first link.

30. The method of claim 10, wherein the first contact is at least one of a person, a group of people and an organization.

* * * * *